(12) United States Patent
Rondelli

(10) Patent No.: US 9,309,045 B2
(45) Date of Patent: Apr. 12, 2016

(54) INTERCHANGEABLE CAPSULE FOR THE PREPARATION OF AN INFUSION OF A POWDERED PRODUCT, AND RELATIVE METHOD FOR OBTAINING SUCH AN INFUSION

(71) Applicant: MACCHIAVELLI S.R.L., San Lazzaro di Savena (IT)

(72) Inventor: Raffaele Rondelli, Argelato (IT)

(73) Assignee: MACCHIAVELLI S.R.L., San Lazzaro di Savena (IT)

( * ) Notice: Subject to any disclaimer, the term of this patent is extended or adjusted under 35 U.S.C. 154(b) by 0 days.

(21) Appl. No.: 14/382,698

(22) PCT Filed: Mar. 5, 2013

(86) PCT No.: PCT/IB2013/051749
§ 371 (c)(1),
(2) Date: Sep. 3, 2014

(87) PCT Pub. No.: WO2013/132436
PCT Pub. Date: Sep. 12, 2013

(65) Prior Publication Data
US 2015/0017290 A1    Jan. 15, 2015

(30) Foreign Application Priority Data

Mar. 5, 2012  (IT) .............................. BO2012A0104

(51) Int. Cl.
*B65D 85/804* (2006.01)
*A23F 5/26* (2006.01)

(52) U.S. Cl.
CPC ............ *B65D 85/8043* (2013.01); *A23F 5/262* (2013.01)

(58) Field of Classification Search
CPC ............. B65D 85/804; B65D 85/8043; B65D 85/8046; B65D 2581/3409; A23F 5/243; A23F 5/26; A23F 5/262
USPC ........... 426/77, 78, 79, 84, 86, 112, 115, 431, 426/432; 99/295
See application file for complete search history.

(56) References Cited

U.S. PATENT DOCUMENTS

2003/0222089 A1* 12/2003 Hale .................. B65D 85/8043
220/574
2006/0065127 A1   3/2006 Dalton et al.
(Continued)

FOREIGN PATENT DOCUMENTS

CN      101287662     10/2008
CN      101535149      9/2009
(Continued)

OTHER PUBLICATIONS

International Search Report and Written Opinion from International Application No. PCT/IB2013/051749 mailed Jul. 19, 2013.
(Continued)

*Primary Examiner* — Drew Becker
*Assistant Examiner* — Bryan Kim
(74) *Attorney, Agent, or Firm* — Dorsey & Whitney LLP

(57) ABSTRACT

A capsule suited to contain inside it a powdered product e.g. powdered coffee) for the preparation of an infusion. The capsule comprises a container closed by a lid. The container is provided with at least a filter of the powdered product/hot water infusion. The capsule is characterized in that it comprises:
a central feeding device for feeding a hot liquid according to a substantially vertical direction; said hot liquid being suited to obtain an infusion with said powdered product; and
a deflecting device, which is arranged transverse to the hot liquid flow coming from said central feeding device; said deflecting device being supported by the bottom of said container by means of a support device.

8 Claims, 5 Drawing Sheets

(56) References Cited

U.S. PATENT DOCUMENTS

| | | | |
|---|---|---|---|
| 2007/0259074 A1* | 11/2007 | Searchilli | B65D 85/8046 426/78 |
| 2008/0028948 A1 | 2/2008 | Kirschner et al. | |
| 2011/0097450 A1* | 4/2011 | Kruger | B65D 85/8043 426/77 |
| 2013/0068109 A1* | 3/2013 | Pribus | A47J 31/46 99/295 |
| 2013/0251861 A1* | 9/2013 | Scapuccin | B65D 85/8043 426/115 |
| 2014/0026761 A1* | 1/2014 | Bartoli | A47J 31/0668 99/295 |
| 2014/0287105 A1* | 9/2014 | Husband | B65D 85/8043 426/115 |
| 2015/0099042 A1* | 4/2015 | Koenig | B65D 85/8043 426/115 |

FOREIGN PATENT DOCUMENTS

| | | |
|---|---|---|
| CN | 101687592 | 3/2010 |
| DE | 102010030988 | 1/2012 |
| EP | 1440908 | 7/2004 |
| EP | 1739060 | 1/2007 |
| EP | 1944248 | 7/2008 |
| EP | 1980501 | 10/2008 |
| WO | WO 02/081337 | 10/2002 |
| WO | WO 2012/117383 | 9/2012 |

OTHER PUBLICATIONS

International Preliminary Report on Patentability from International Application No. PCT/IB2013/051749 mailed Mar. 13, 2014.
European Search Report from European Application No. 13 721 063.9-1708 mailed Aug. 5, 2015.

* cited by examiner

INTERCHANGEABLE CAPSULE FOR THE PREPARATION OF AN INFUSION OF A POWDERED PRODUCT, AND RELATIVE METHOD FOR OBTAINING SUCH AN INFUSION

TECHNICAL FIELD

The present invention concerns an interchangeable capsule for the preparation of an infusion of a powdered product, e.g. coffee or the like.

The present invention further concerns a method for obtaining an infusion of said powdered product.

In particular, the present invention concerns the preparation of the so called "American coffee".

Incidentally, although the present invention finds an advantageous but not exclusive application to interchangeable capsules for the preparation of an infusion of "American coffee" (to which the following description will explicitly refer, without ever losing its general character), the teaching of the present invention can be applied to any kind of interchangeable capsule, e.g. to interchangeable capsules for espresso, tea, chamomile tea, etc.

BACKGROUND ART

As already known, the so called "American coffee" is an infusion made by means of a particular machine wherein the hot water passes through a filter containing ground unpressed coffee and settles by gravity in an underlying pot.

The coffee used for the preparation of such a drink is different from the one used by mocha machines or machines for Italian espresso because it is more roughly ground and it is not subjected to any pre-compression when it is in the capsule.

Some machines, which are presently commercially available, have been expressly designed for the preparation of American coffee and are characterized by a very simple operation.

In fact, these machines have a water tank, a pump sending heated water inside a small container provided with a paper filter containing coffee. The hot water submerges the coffee and, passing through the paper filter, falls by gravity into the dedicated underlying pot which is suited to keep the drink hot for a long time because it is heated by a special electrical resistance.

Besides traditional American coffee machines, wherein the cone-shaped filter is manually filled by the user, capsules having an outer casing containing a paper filter partially filled with unpressed coffee have recently appeared on the market.

By means of suitable percolator machines, the plastic lid and the plastic bottom are pierced in order to create a hot water flow infusing the coffee powder.

However, the capsules which are presently commercially available are not completely reliable. In fact, since they usually have only one filter in the bottom, the incoming hot water is induced to flow along substantially vertical preferential fluid threads which, therefore, do not involve the whole mass of powdered product contained in the capsule.

DISCLOSURE OF INVENTION

Therefore, the main object of the present invention is to provide an interchangeable capsule for infusions wherein the path of the infusing water inside said capsule is as long and as winding as possible in order to delay the infusion times and in order to involve the largest possible amount of product.

A further object of the present invention is to provide an innovative method for obtaining such an infusion.

According to the present invention, therefore, an interchangeable capsule is produced according to the content of claim 1 or of any of the claims directly or indirectly dependent on claim 1.

Always according to the principles of the present invention, it is provided an innovative method for obtaining an infusion of a powdered product according to the content of claim 10 or of any of the claims directly or indirectly dependent on claim 10.

BRIEF DESCRIPTION OF THE DRAWINGS

For a better understanding of the present invention it is described hereinafter an embodiment given for mere illustrative and not limitative purposes, with a reference to the annexed figures, wherein.

BEST MODE FOR CARRYING OUT THE INVENTION

The enclosed figures show a preferred embodiment of an interchangeable capsule 100 produced according to the principles of the present invention.

The interchangeable capsule 100 is suited to contain inside it a certain amount of a powdered product (e.g. coffee) for preparing an infusion, in particular, an "American coffee" according to the above definition.

The interchangeable capsule 100 comprises a container 101 closed by a lid 102 by means of known methods.

The container 101 comprises, in turn, a bottom 101A advantageously but not necessarily produced in one piece with the side wall 101B.

It must be noticed that an axis (X) passes through the bottom 101A, said axis substantially lying on a plane ($\pi$), which defines a substantially horizontal direction.

Moreover, in the present description, any "substantially horizontal" element, body or device is an element, body or device substantially lying on the plane ($\pi$). Obviously, also elements bodies or devices substantially lying on any plane parallel to plane ($\pi$) must be considered "substantially horizontal".

Figure 2:
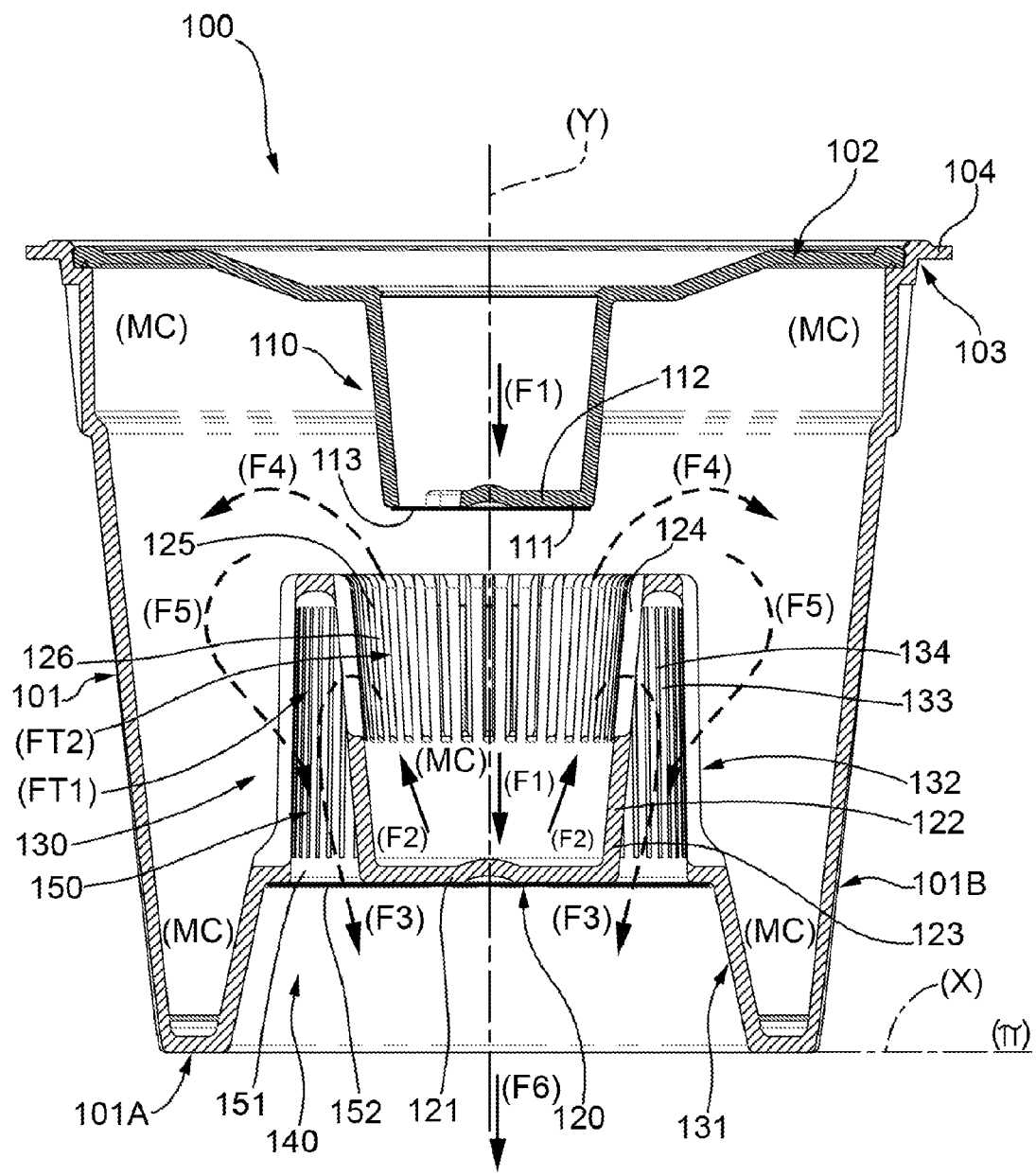
FIG. 2 shows a first longitudinal section of the capsule of FIG. 1.
Figure 3:
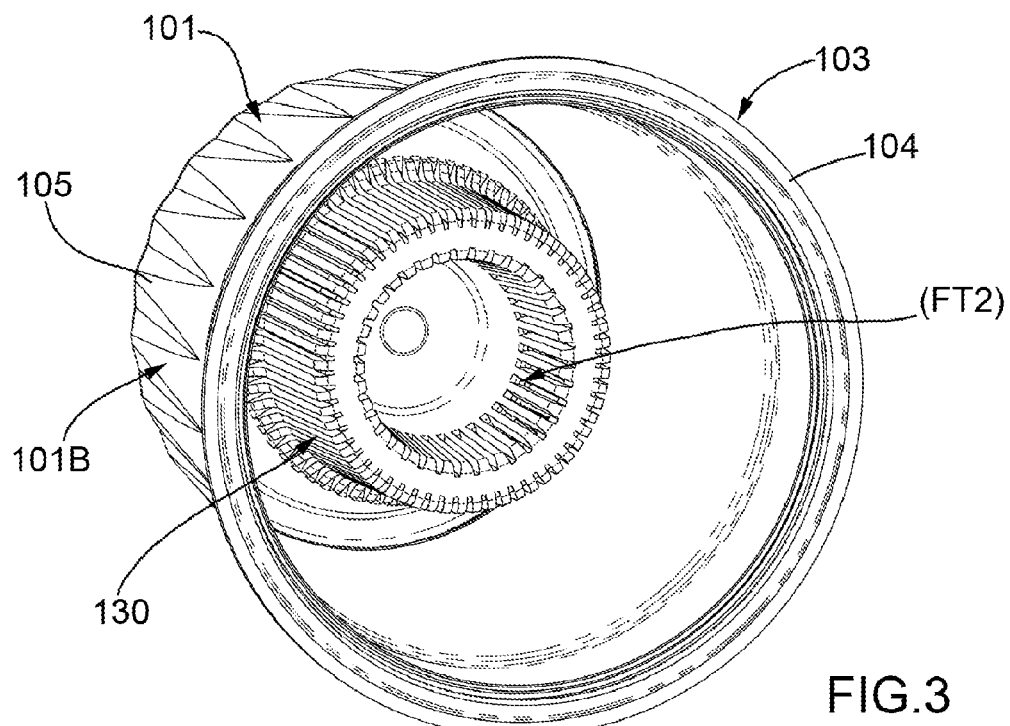
FIG. 3 shows a 3D view from above of a container for the powdered product belonging to the capsule according to FIGS. 1 and 2.
Figure 4:
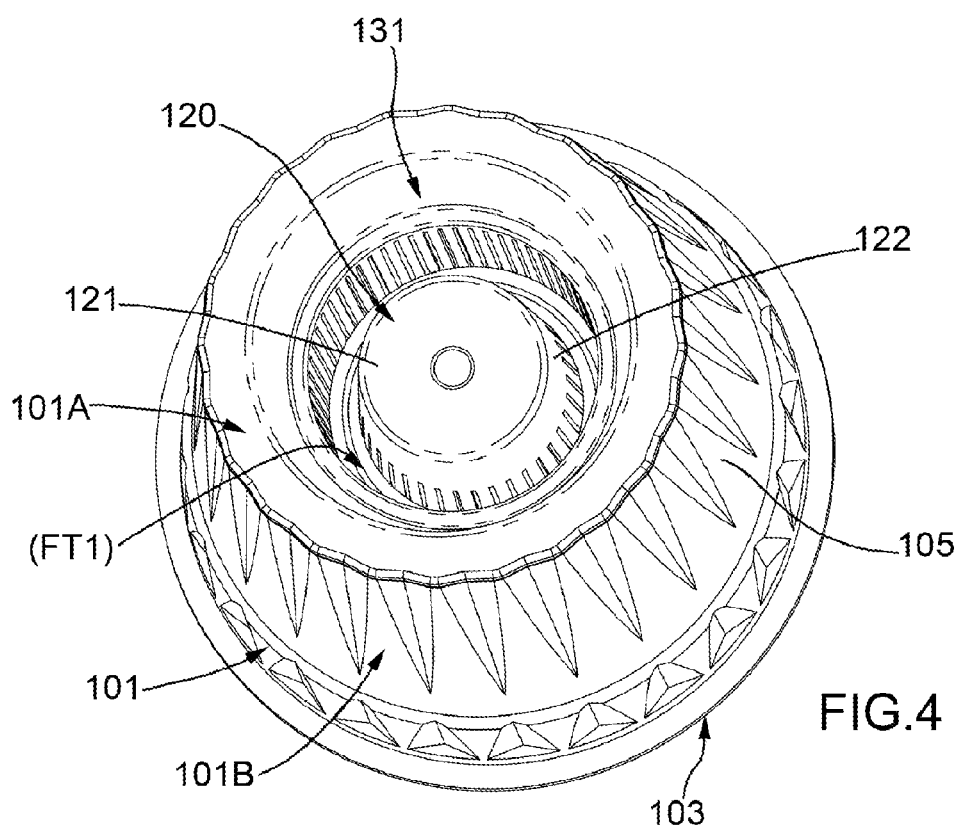
FIG. 4 shows a 3D view from below of the container of FIG. 3.
Figure 7:
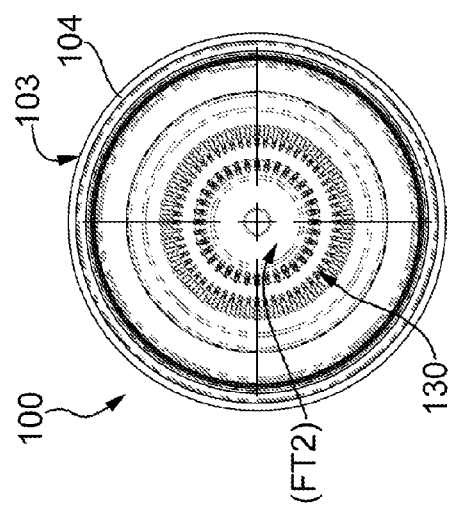
FIG. 7 shows a front view of the container shown in FIGS. 3, 4, 5, 6.
Figure 5:
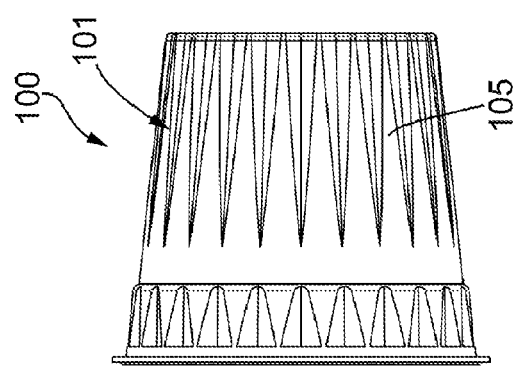
FIG. 5 shows a side view of the container shown in FIGS. 3 and 4.
Figure 6:
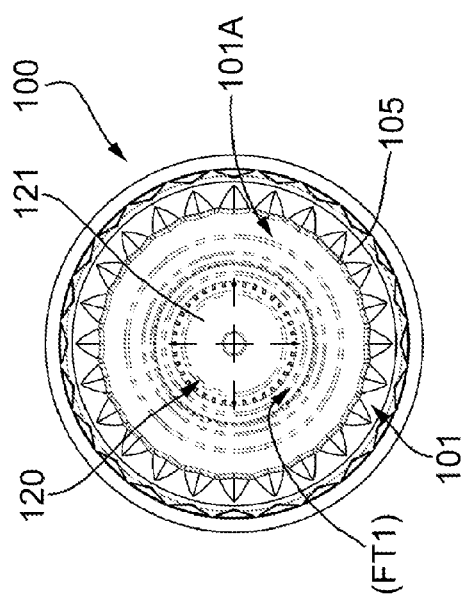
FIG. 6 shows a back view of the container shown in FIGS. 3, 4, 5.

As shown in FIG. 2, the side wall 101B shows a central vertical axis of symmetry (Y) which is perpendicular to the aforesaid axis (X).

Therefore, in the present description, any "substantially horizontal" element, body or device is an element, body or device substantially extending according to the direction defined by axis (Y).

The side wall 101B has the usual substantially truncated-cone shape, flared upwards.

An annulus-shaped support edge 104 protrudes from the upper end 103 of the container 101 so that the whole interchangeable capsule 100 can be received in a special housing created in a percolator machine (not shown). Preferably, but not necessarily, the bottom 101A, the side wall 101B and the support edge 104 are made in one piece of a suitable plastic material for foods of a known type.

Figure 1:
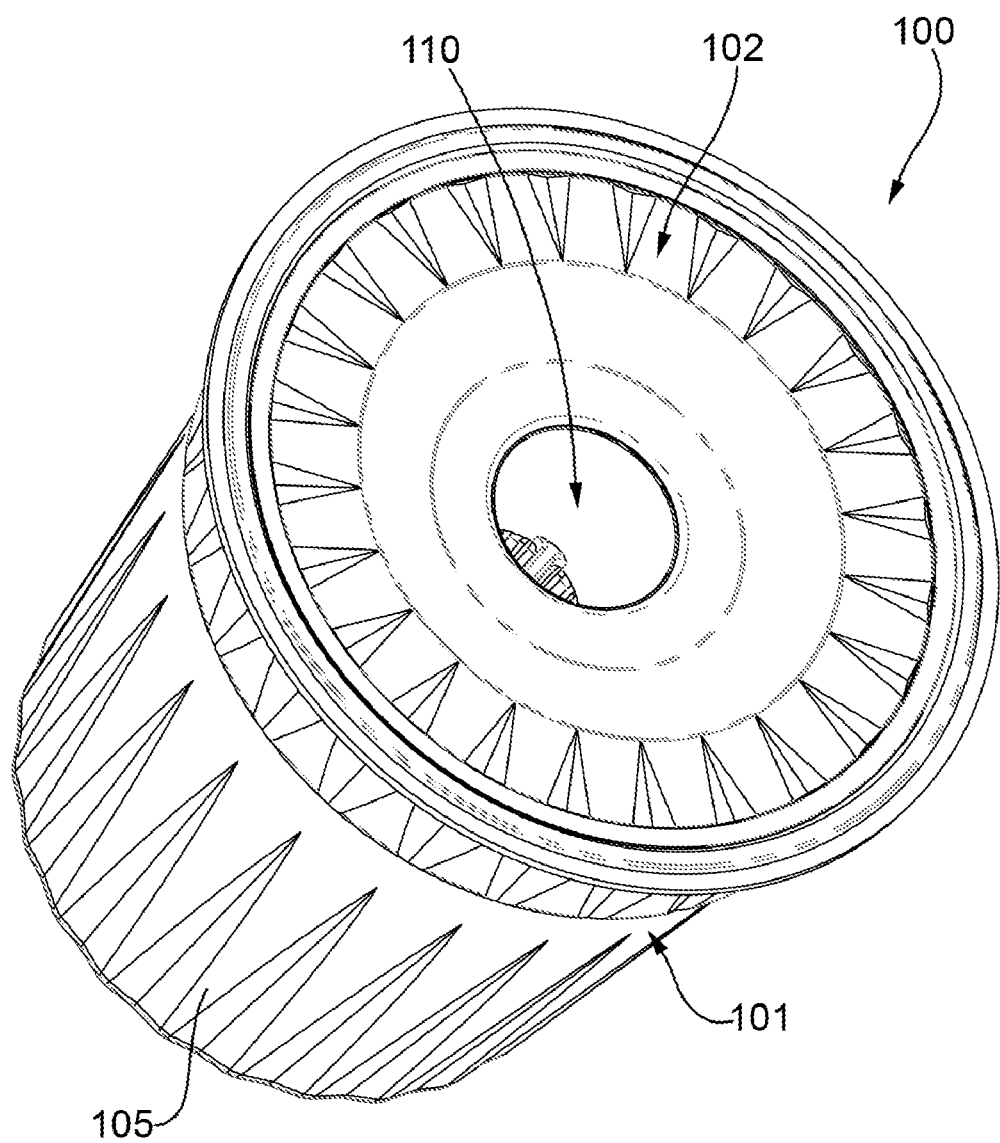
FIG. 1 shows a 3D view of an interchangeable capsule for a powdered product according to the present invention.

The outer surface of the side wall 101B could also be provided with some ribs 105 (FIG. 1) to strengthen the structure of said side wall 101B.

As shown in particular in FIG. 2, a feeding well 110 protrudes from the lid 102 towards the inside of the container 101.

Figure 8:
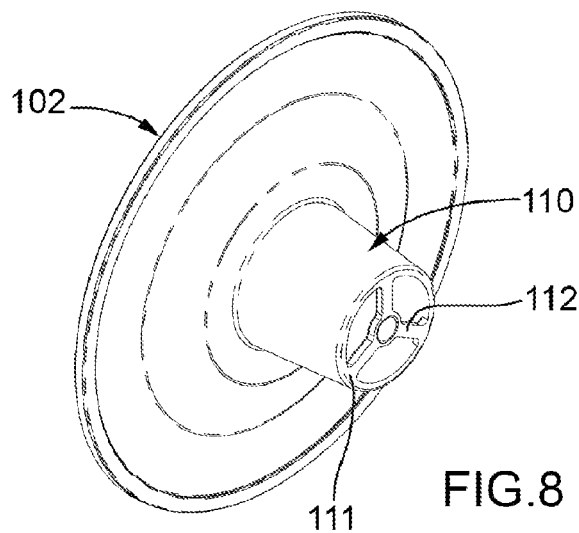
FIG. 8 shows a 3D view from below of a lid belonging to the capsule according to FIGS. 1 and 2; this lid, in use, is coupled to the container in order to form the capsule shown in FIGS. 1, 2.
Figure 9:
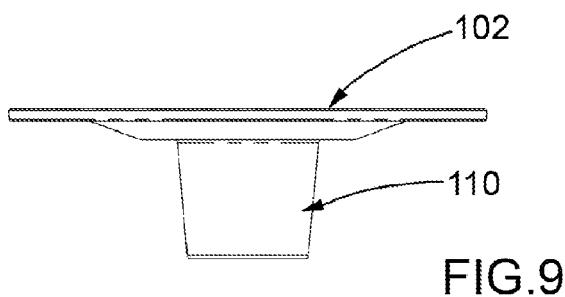
FIG. 9 shows a side view of the lid of FIG. 8.
Figure 10:
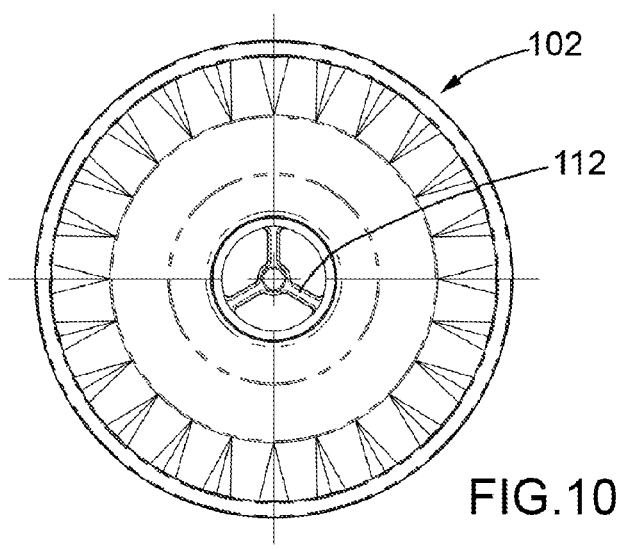
FIG. 10 shows a plan view of the lid of FIG. 8.

As shown in greater detail in FIG. 8, the bottom 111 of the feeding well 110 is provided with three spokes 112 whereon, in use, a filter 113 (FIG. 2) is fastened, said filter allowing the passage of hot water from the feeding well 110 to the inside of the container 101, but not the other way. In other words, the filter 113 acts as separating element between the hot water coming from the feeding well 110 and the infusion inside the container 101. In fact, a possible accidental reflux of the infusion towards the feeding well 110 is prevented by the fact that the hot water pressure inside the feeding well 110 is obviously always higher than the infusion pressure in the container 101, a depression being present outgoing from the capsule 100.

As shown in particular in FIG. 2, below the feeding well 110 there is a small tank 120 (also having an axis (Y)) supported by the bottom 101A of the container 101 by means of a cup-shaped support device 130 coaxial to the small tank 120.

The support device 130, having a transverse size larger than that of the small tank 120, is arranged outside said small tank 120.

In particular, the small tank 120 has a circular-shaped bottom which is transverse to the incoming water jet whose direction and orientation are defined by an arrow (F1). In other words, the bottom 121 represents a deflecting device (transverse to axis (X)), substantially horizontal, of the infusion jet, substantially vertical, whose direction and orientation are defined by the arrow (F1). Besides bottom 121, the small tank 120 comprises a truncated-cone-shaped side wall 122.

After the impact with the bottom 121, the infusion liquid jet (therefore already comprising a certain amount of the product infused in hot water) is horizontally and radially deflected according to directions and orientations defined by the arrows (F2).

In the embodiment shown in the enclosed figures, the small tank 120 is raised with respect to the plane (π) in order to form an underlying chamber 140, which will be useful for reasons better explained hereinafter.

More precisely, the chamber 140 is defined from above by the bottom 121 and laterally by a lower truncated-cone shaped portion 131 of the support device 130.

As shown in FIG. 2, a toroidal space 150 is defined between the inner wall of an upper portion 132 of the support device 130 and the outer wall of the small tank 120, said space being in hydraulic communication with the chamber 140 by means of an annulus-shaped passage 151.

Advantageously, but not necessarily, the upper portion 132, substantially cylindrical, of the support device 130 is provided with a plurality of indentations 133.

Between each pair of indentations 133 it is therefore defined a related through opening 134 allowing the outflow of the infusion.

Obviously, the width of each through opening 134, advantageously shaped like an indentation, has been calculated in order to prevent, as far as possible, the passage of granules of ground product dragged by the hot infusion.

The indentations 133 and the openings 134 form together first vertical filtering means (FT1) suited to filter the infusion (see hereinafter).

Also the wall 122 of the small tank 120 comprises a full lower portion 123 and an upper portion 124 possibly provided with a plurality of indentations 125. Between each pair of indentations it is defined a related through opening 126 allowing the passage of the hot water/powdered product infusion.

The indentations 125 and the openings 126 form together second vertical filtering means (FT2) suited to filter the infusion of powdered product outgoing from the small tank 120 (see hereinafter).

Obviously, also in this case the width of each through opening 126, advantageously shaped like an indentation, has been calculated in order to prevent, as far as possible, the passage of granules of ground product dragged by the hot infusion.

In short, it can be stated that the present invention comprises all possible combinations between first vertical filtering means (FT1) and second vertical filtering means (FT2). At least one of two vertical filtering means (FT1), (FT2) is present. Therefore, only first vertical filtering means (FT1), or only second vertical filtering means (FT2), or both vertical filtering means (FT1), (FT2) can be present.

The choice of kind of filtering means, their allocation and their structure, in terms of indentations and through openings, is made by the manufacturer of the interchangeable capsule 100 before starting the production of the same according to the chemical and physical properties of the powdered product which will be the base of the infusion.

Advantageously, but not necessarily, the annulus-shaped passage 151 is provided with a further filter 152 (made of paper, felt, etc.) in order to filter further the percolating liquid before it enters the chamber 140.

The mass of powdered product (MC) is present both in the space defined between the inner wall of the container 101 and the outer wall of the support device 130 and inside the small tank 120.

Furthermore, advantageously but not necessarily, the chamber 130 is at least partially filled by a waffle containing at least one more essence, such as cardamom, cinnamon or ginseng.

The present capsule 100 works as follows:

a) the pressurized hot water enters the container 101 from the feeding well 110, after having passed through filter 113, according to the direction and orientation indicated by the arrow (F1);

b) immediately after having passed through filter 113, the hot water meets the powdered product (MC) arranged between the feeding well 110 and the small tank 120; the product/hot water infusion liquid starts to be formed;

c) this infusion liquid hits the bottom 121 of the small tank 120 and is horizontally and radially deflected according to the directions and orientations of the arrows (F2);

d) in case second vertical filtering means (FT2) are provided, a first portion of the infusion liquid passes immediately through the openings 126 of second vertical filtering means (FT2) for flowing towards the toroidal space 150 (arrows (F3)); from this toroidal space 150 the infusion flows towards the chamber 140 after having possibly been filtrated by the filter 152; passing through the waffle, in case present in the chamber 140, the infusion takes the taste of the substance contained by the waffle;

e) a second portion of the infusion liquid is deflected according to directions and orientations given by the arrows (F4) in order to involve also the mass of powdered product (MC) arranged in the space defined between the container 101 and the support device 130;

f) in case also first vertical filtering means (FT1) are present, the infusion will be deflected according to the directions and the orientations given by the arrows (F5) to pass through the openings 134 and to converge to the toroidal space 150 together with the infusion whose origin is indicated by the arrows (F3);

g) the infusion according to the arrow (F3) and the infusion according to the arrow (F5), joined together in the toroidal space 150, undergo a further filtering operation by means of the filter 152; the final infusion (arrow (F6)) is therefore enriched with an essence possibly present in the chamber 140 and is sent to the final user.

In another embodiment, not shown, the pressurized hot water enters the container, not through the well 110 but through a hole pierced in the lid 102 by known means.

The present invention also refers to a method for obtaining an infusion, in particular an American coffee; the method is characterized by the following steps:

(f1) centrally and vertically injecting a given amount of hot water into a container of the powdered product;

(f2) causing at least part of the hot water to be deflected in a substantially horizontal direction by a front element which the hot water hits head-on along its path;

(f3) filtering the infusion in said substantially horizontal direction by causing it to pass through substantially vertical filtering means;

(f4) causing the filtered infusion to converge towards a collection chamber;

(f5) causing the filtered infusion to flow towards a receptacle.

The method can further comprise a further filtering step of the outgoing infusion.

Moreover, the method can comprise a further step wherein the infusion passes through means containing at least an essence, such as cardamom, cinnamon or ginseng.

The advantages of the disposable capsule object of the present invention are as follows:

the capsule object of the invention has, preferably but not necessarily, a central well through which the hot water outgoing from a single jet of the machine flows; therefore, the hot water is evenly distributed in the mass of ground product; this feature allows an even and constant control of the water distribution in the capsule;

the bottom of the capsule, or better to say, the bottom of the space containing the powdered product, is closed, thus avoiding preferential vertical water outflows during the infusing step, as is the case with the other known capsules having a filter in the bottom or a single opening produced by piercing the bottom itself;

the infusion filtering area is substantially vertical in order to obtain a larger filtering area if compared to the capsules having only a coffee filter arranged in the bottom; moreover, this vertical filtering creates a turbulence effect, thus improving the exploitation of the product to be infused;

the capsule object of the present invention allows the production of several different products by calibrating the water inlet and the product outlet according to the product itself;

the capsule objet of the present invention allows to contain larger volumes of product though maintaining equal filtering capacity;

the capsule is advantageously produced in one piece with several sections, thus allowing the use of a simpler packaging machine for the industrialization of the capsule;

in the industrialization step, the capsule object of the present invention allows to carry out a central dosing, thus simplifying the related packaging machines; and the structure of the capsule object of the present invention creates inside it a winding liquid path, thus allowing the maximum exploitation of the contained infusion.

The invention claimed is:

1. A capsule suitable to contain therein a powdered product for preparing an infusion, the capsule comprising:
   a container closed by a lid, the container having a bottom and a truncated-cone shaped portion extending from the bottom into an inner space of the container, the container provided with filtering means for filtering the powdered beverage product/hot water infusion;
   a central feeding device for feeding a hot liquid according to a substantially vertical direction, the hot liquid suitable to obtain an infusion with the powdered beverage product;
   a support device extending from the truncated-cone shaped portion into the inner space of the container and away from the bottom of the container; and
   a deflecting device arranged substantially transverse to a flow of the hot liquid coming from the central feeding device, the deflecting device supported by the support device, the deflecting device and the truncated-cone shaped portion defining a chamber having an open side that opens toward the bottom of the container;
   wherein the filtering means is substantially vertical and arranged on the deflecting device and extends substantially transversely relative thereto.

2. The capsule according to claim 1, wherein the support device includes an outer support cup that is coaxial to the deflecting device.

3. The capsule according to claim 2, wherein the support device has a transverse size larger than the deflecting device, and is arranged outside the deflecting device.

4. The capsule according to claim 1, wherein the central feeding device includes a feeding well provided with a filter.

5. The capsule according to claim 1, wherein, during operation and after hitting the deflecting device, a jet of infusion liquid is horizontally and radially deflected.

6. The capsule according to claim 1, wherein the deflecting device includes a small tank that is raised with respect to a horizontal plane so as to form an underlying chamber.

7. The capsule according to claim 6, further comprising a toroidal space defined between an inner wall of an upper portion of the support device and an outer wall of the small tank, the toroidal space in hydraulic communication with the chamber by an annulus-shaped passage.

8. The capsule according to claim 1, wherein the filtering means includes a first vertical filter and a second vertical filter each of which includes a plurality of respective indentations.

* * * * *